US010820320B2

(12) United States Patent
Wang et al.

(10) Patent No.: US 10,820,320 B2
(45) Date of Patent: Oct. 27, 2020

(54) METHODS, COMMUNICATION DEVICES AND NETWORK NODES FOR ENHANCING COMMUNICATION IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Jose Luis Pradas, Stockholm (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/335,313

(22) PCT Filed: Oct. 14, 2016

(86) PCT No.: PCT/SE2016/050994
§ 371 (c)(1),
(2) Date: Mar. 21, 2019

(87) PCT Pub. No.: WO2018/070908
PCT Pub. Date: Apr. 19, 2018

(65) Prior Publication Data
US 2020/0029326 A1 Jan. 23, 2020

(51) Int. Cl.
*H04W 72/04* (2009.01)
*H04W 56/00* (2009.01)
*H04W 52/02* (2009.01)

(52) U.S. Cl.
CPC ..... *H04W 72/0446* (2013.01); *H04W 56/001* (2013.01); *H04W 72/042* (2013.01); *H04W 72/048* (2013.01); *H04W 52/0216* (2013.01)

(58) Field of Classification Search
CPC .................................................. H04W 72/0446
See application file for complete search history.

(56) References Cited

U.S. PATENT DOCUMENTS

2010/0120443 A1* 5/2010 Ren .................. H04W 56/0045
455/450
2014/0003279 A1 1/2014 Ren

FOREIGN PATENT DOCUMENTS

EP 2408243 A1 1/2012

OTHER PUBLICATIONS

"Infrequent small data transmissions for inactive UEs", 3GPP TSG-RAN WG2 #94; Tdoc R2-164028; Nanjing, P.R. China, May 23-27, 2016, pp. 1-5.

* cited by examiner

*Primary Examiner* — Sulaiman Nooristany
(74) *Attorney, Agent, or Firm* — Murphy, Bilak & Homiller, PLLC

(57) ABSTRACT

Disclosed is a method performed by a communication device (120) for enhancing wireless communication with a network node (110) of a wireless communication network (100). The communication device (120) has received, from the network node, a first timing advance, TA, value at a first time point when in active state, and the communication device has thereafter switched to inactive state. The method comprises switching from inactive to active state, after obtaining an indication of data transfer, determining whether the first TA value is still valid, employing the first TA value for sending data to the network node when the first TA value is determined to be valid, and employing an updated TA value for sending data to the network node when the first TA value is determined not to be valid. By determining that the first TA value is still valid and in these cases reusing the first (Continued)

TA value, communication resources that would otherwise have been used for updating the TA value can be spared.

8 Claims, 9 Drawing Sheets

METHODS, COMMUNICATION DEVICES AND NETWORK NODES FOR ENHANCING COMMUNICATION IN A WIRELESS COMMUNICATION NETWORK

TECHNICAL FIELD

The present disclosure relates generally to a method performed by a communication device and a communication device for enhancing wireless communication with a network node of a wireless communication network. More specifically, the disclosure relates to such a method and communication device wherein the communication device has received, from the network node, a first timing advance, TA, value at a first time point when in active state, and wherein the communication device has thereafter switched to inactive state. The present disclosure further relates to a corresponding method performed by a network node, as well as a corresponding network node and also computer programs and carriers.

BACKGROUND

Communication networks are developed in the direction of a society wherein not just regular mobile phones handled by humans are connected to the communication network but also devices, such as vending machines, refrigerators etc. This is called Internet of Things, IoT. Such IoT communication devices may not need a connection to the communication network especially often, for example, some of them may only need to be connected for receiving updates and for reporting its functional status. In for example such a context, small data transfers are discussed. A small data transfer can be defined as wherein a communication device only needs to wake up, i.e. go to active state, for a short period for receiving or sending a small amount of data and can thereafter go back to inactive state again, e.g. go to sleep again.

The wireless communication networks need to be designed to suit the transfer of small data well, with the functionality to support fast and efficient switch between active state and inactive state. For example, in Long Term Evolution, LTE, a communication device typically switch between the active state RRC_CONNECTED and the inactive state RRC_IDLE when the UE change between small packet transmission and silence periods. In order to reduce the signaling overhead and the associated processing load in the network, a new feature called "RRC resume/suspend" is being under discussion by 3GPP and may be introduced in LTE Release 13. RRC resume/suspend allows an RRC connection to be suspended during UE's silence periods and at a later time resumed when new data is available. In this way, the full signaling procedure for RRC_IDLE to RRC_CONNECTED state transition can be avoided for small data transmission.

For LTE, uplink transmission orthogonality is achieved by ensuring that the transmissions from different UEs in the same cell are received by the network node, e.g. eNodeB, time-aligned. Thus, intra-cell interference between UEs can be avoided. The time alignment is implemented by applying a timing advance, TA, value at UE transmitted uplink, UL, sub-frames, relative to the received downlink, DL, subframe. The TA is a negative offset, which means that the UL transmitted sub-frame with TA adjustment takes place in advance compared to the received DL sub-frame. The TA value is equal to 2 times propagation delay, assuming that the same propagation delay value applies to both DL and UL transmission directions. How TA is applied to UL transmission is illustrated in FIG. 1, where two UEs, UE1 and UE2, are located in a cell with different distances from the eNodeB, eNB, UE1 is closer to the eNB than UE2. The DL propagation delay between eNB and UE1 is denoted as Dp1, and the DL propagation delay between eNB and UE2 is denoted as Dp2. Since UE1 is closer to the eNB than UE2, Dp1<Dp2. The TA value is set to 2 times propagation delay so that the transmissions from UE1 and UE2 are ensured to be received by eNB at the same time. 1.1 denotes a DL subframe sent from the eNB, The DL subframe is received 1.2 at UE1, Dp1 time units later. Consequently, for the corresponding UL subframe sent 1.3 from UE1 to be received 1.4 at the eNB at the same time as the DL subframe is sent 1.1 from the eNB, it has to be sent 1.4 with a TA1 that is two times Dp1. Similarly for UE2, the DL subframe sent 1.1 from the eNB is received 1.5 at UE2, Dp2 time units later. Consequently, for the corresponding UL subframe sent 1.6 from UE2 to be received 1.7 at the eNB at the same time as the DL subframe is sent 1.1 from the eNB, it has to be sent 1.7 with a TA2 that is two times Dp2.

According to the LTE 3GPP standard, TA takes values in the range of 0-0.67 ms with a granularity of 0.52 us. For a TA value of 0.52 us, the corresponding propagation distance between the eNB and the UE can be calculated as $(3\times10^9\times 0.52\times10^{-6})/2=78$ m, while for a TA value of 0.67 ms, the corresponding propagation distance between the eNB and the UE can be calculated as $(3\times10^9\times0.67\times10^{-3})/2=100$ km which is the maximum propagation distance. In other words, the maximum distance would facilitate a cell radius of up to 100 km.

A random access is initiated for the UE towards the network for several purposes including mainly:

for establishment of an initial radio link for the UE, which moves the UE from the RRC IDLE status to the RRC connected status.

for re-establishment of the radio link if the radio link failure is triggered.

for uplink synchronization between the UE and the network.

In the latter case, a TA value is estimated by the network from a Physical Random Access Channel. PRACH, transmission by the UE and the TA value is assigned to the UE, included in the random access response message, for the UE to adjust the uplink timing.

As mentioned above, the initial UL synchronization between the UE and the network is obtained via a random access channel, RACH, access procedure. After that, when the UE is in active state, the eNB continuously measures timing of uplink signal, via Physical Uplink Shared Channel, PUSCH, or Physical Uplink Control Channel, PUCCH or Sounding Reference Signal, SRS, transmitted from each UE and the eNB adjusts the uplink transmission timing if necessary. The TA adjustment is sent by the eNB using for example a Media Access Control, MAC, Control Element. Such TA updates are mainly due to any of the following reasons:

Movement of a UE, leading to changes of the propagation delay between the UE and the eNB, depending primarily on the distance of the UE from the eNB;

Changes of the propagation paths, for example, some paths disappear, and some new ones arise, causing changes to the propagation delay;

Oscillator drift in the UE, where the accumulation of small frequency errors over time may result in timing errors;

Doppler shift arising from the UE movement, resulting in an additional frequency offset of the UL signals received at the eNB.

For a UE with small data transfers, the UE more or less frequently switches between the active and inactive states. The UE will lose UL sync if the UE stays in the inactive state for a certain time period due to no uplink transmission, especially when the UE moves fast. In such a case, the UE has to re-obtain UL sync in order to transmit a single small packet, e.g. UL data or an ACK/NACK in response to received DL data. The conventional solution for such a TA update is to execute the RACH procedure to obtain UL time synchronization. For machine type communication, MTC, devices, the devices typically transmit the packets infrequently, for example, every few minutes or hours. In smartphone app traffic, it is also common that short data, confirmation, or keep-alive messages are transmitted at infrequent intervals. Using the RA procedure in those cases to obtain the uplink synchronization is not efficient due to several reasons. Firstly, the RA procedure will introduce additional latency. In some cases, the duration of the RA procedure may exceed the duration of the data transfer itself. This may not be acceptable, particularly for delay critical small data transfer. Secondly, RACH capacity might be a bottleneck due to limited PRACH resources, e.g., number of preambles, especially in high loaded system. This would lead to additional latency. Therefore, using existing RA procedure to achieve uplink synchronization for small data transfer is not efficient. It is meaningful to study alternative, RACH-less procedures to obtain UL sync.

In New Radio, NR, i.e. the term used in 3GPP for the new radio interface related to 5G, it could be envisioned that a UE could transit from the in-active state to the active state and do data transmission directly on a contention based channel or to use a semi-persistent grant. However, this would require that the UE still has a valid TA value. If the TA is not valid, the UE would first need to do the random access procedure to obtain a valid TA value. Therefore, it would be advantageous to have a procedure to ensure a valid TA for UEs also in NR, to avoid random access for small data transmissions.

SUMMARY

It is an object of the invention to address at least some of the problems and issues outlined above. It is an object of embodiments of the invention to improve the process of sending data from a wireless communication device towards a network node of a communication network. It is another object of embodiments of the invention to improve the process of handling time alignment updates in a communication network. It is possible to achieve these objects and others by using a method and an apparatus as defined in the attached independent claims.

According to one aspect, a method is provided, performed by a communication device for enhancing wireless communication with a network node of a wireless communication network. The communication device has received, from the network node, a first timing advance, TA, value at a first time point when in active state, and the communication device has thereafter switched to inactive state. The method comprises switching from inactive to active state, after obtaining an indication of data transfer, determining whether the first TA value is still valid, employing the first TA value for sending data to the network node when the first TA value is determined to be valid, and employing an updated TA value for sending data to the network node when the first TA value is determined not to be valid.

According to another aspect, a communication device is provided, operable for communication with a network node of a wireless communication network, The communication device has received, from the network node, a first timing advance, TA, value at a first time point when in active state, and the communication device has thereafter switched to inactive state. The communication device comprising a processor and a memory. The memory contains instructions executable by said processor, whereby the communication device is operative for switching from inactive to active state, after obtaining an indication of data transfer, determining whether the first TA value is still valid, employing the first TA value for sending data to the network node when the first TA value is determined to be valid, and employing an updated TA value for sending data to the network node when the first TA value is determined not to be valid.

According to another aspect, a method is provided, performed by a network node of a wireless communication network, for enhancing wireless communication with a communication device. The method comprises sending, to the communication device, a first TA value at a first time point when the communication device is in active state, and sending, to the communication device, at a time point later than the first time point, an instruction to determine whether the first TA value is still valid, and to employ the first TA value for sending data to the network node in accordance with the determination.

According to another aspect, a network node is provided, operable in a wireless communication system configured for enhancing wireless communication with a communication device. The network node comprises a processor and a memory. The memory contains instructions executable by said processor, whereby the network node is operative for sending, to the communication device, a first TA value at a first time point when the communication device is in active state, and sending, to the communication device, at a time point later than the first time point, an instruction to determine whether the first TA value is still valid, and to employ the first TA value for sending data to the network node in accordance with the determination.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to improve the process of sending data from a wireless communication device towards a network node of a communication network, especially for a device that more or less frequently moves between active and inactive state. This is achieved by the device, after switching from inactive to active state, determining whether the TA value it used before going into inactive state last time is still valid. If it determines that the TA value is still valid, it reuses the last TA value. However, if it determines that the TA value is not valid anymore, it obtains a new TA value. Thereafter, it communicates UL with the network node using the selected value. Such reusing of the old TA value would spare network resources, such as RACH resources. Also, when the old TA value is reused, the process from activating until sending can be performed is shorter than if a RACH procedure first has to be performed.

Figure 1:
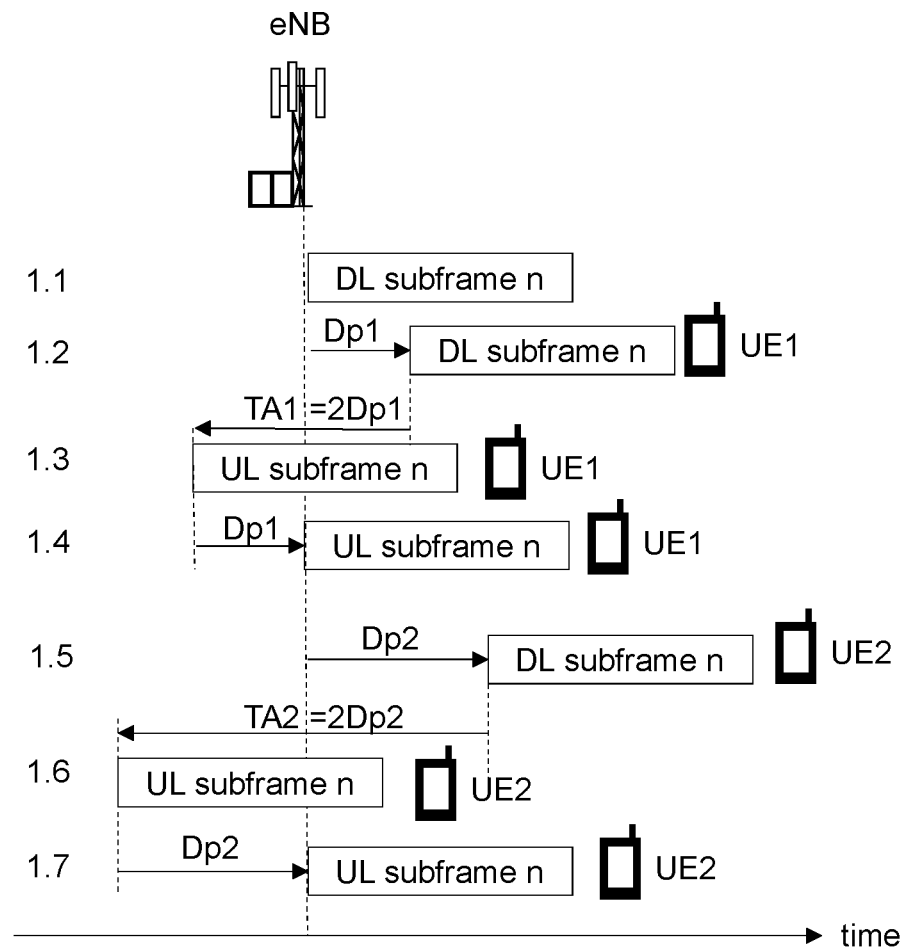
FIG. 1 is a communication scenario illustrating UL and DL transmission in a wireless communication system using timing advance, TA, according to the prior art.
Figure 2:
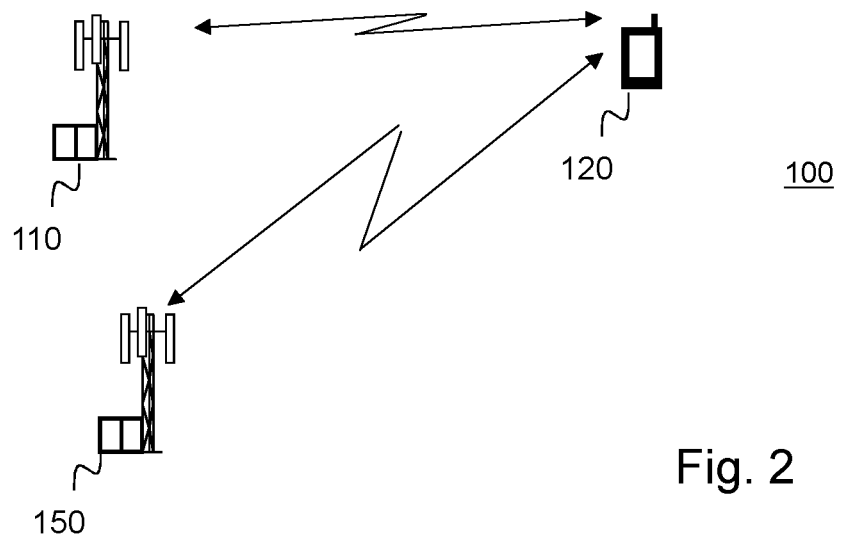
FIG. 2 is a schematic block diagram of a wireless communication system in which the present invention may be used.

FIG. 2 shows a wireless communication network 100 in which the present invention may be used. The wireless network comprises a network node 110. The network node 110 may be any kind of node providing wireless access to wireless communication devices 120 that are situated in a cell, i.e. a geographically limited area that is covered by wireless signals sent from the network node. The network node 110 may be for example a radio base station, an eNodeB, a radio head or radio unit of a distributed base station or an access point of e.g. a Wireless Local Area Network, WLAN. The wireless communication device may be any kind of device having wireless communication abilities for communication with the network node of the communication network, such a mobile phone, a laptop, a palmtop, a machine communication device, a UE etc. The wireless communication network may be a network based on e.g. Global System for Mobile communication, GSM, Code Division Multiple Access, CDMA, Wideband CDMA, W-CDMA, CDMA2000, General Packet Radio Services, GPRS, EDGE, 3G, LTE, WLAN, NR, etc. The communication network 100 may also comprise a second network node 150.

Figure 3:
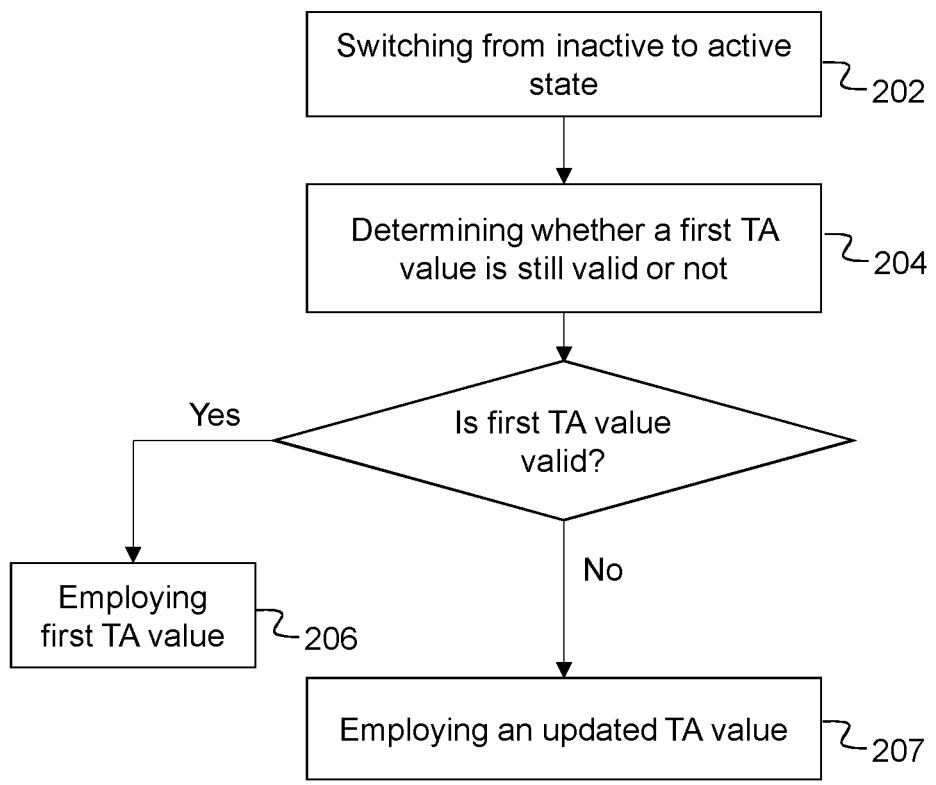
FIG. 3 is a flow chart illustrating a method performed by a wireless communication device, according to possible embodiments.

FIG. 3, in conjunction with FIG. 2, shows a method according to an embodiment, performed by a communication device 120 for enhancing wireless communication with a network node 110 of a wireless communication network 100. The communication device 120 has received, from the network node, a first timing advance, TA, value at a first time point when in active state. The communication device has thereafter switched to inactive state. The method comprises switching 202 from inactive to active state, after obtaining an indication of data transfer, and determining 204 whether the first TA value is still valid. The method further comprises employing 206 the first TA value for sending data to the network node when the first TA value is determined to be valid, and employing 207 an updated TA value for sending data to the network node when the first TA value is determined not to be valid.

Employing a TA value for sending data to the network node signifies using the TA value so that uplink transmissions from different communication devices arrives at the network node substantially simultaneously, irrespective of their distance to the network node, thanks to different TA-values at different communication devices. The first TA value may also be called an initial TA value. The first TA value may be any TA value received at the first time point, before switching from active to inactive state, such as the latest TA value received from the network node before switching to inactive state. The data transfer may be either uplink or downlink transmission. The indication of downlink data transfer may be a message received from the network node, such as a paging message to indicate that there is downlink data coming. The indication of uplink data transfer may be a detection of content in an output buffer of the communication device.

As stated above, the communication device determines whether to employ an updated TA value or to employ, i.e. reuse, the first TA value. Hereby, a procedure for obtaining an updated TA value, e.g. a RACH procedure, can be avoided for updating the TA value, when the first TA value received before going into inactive state can be reused. As a result, network resources, e.g. RACH preamble resources, are set free that would otherwise have been used for the procedure of updating the TA value. Also, when the first TA value is to be reused, the communication device knows more or less instantly which TA value that it is to use and can communicate with the network node earlier than it could have, if it had to wait for e.g. a RACH procedure to be performed.

Figure 4A:
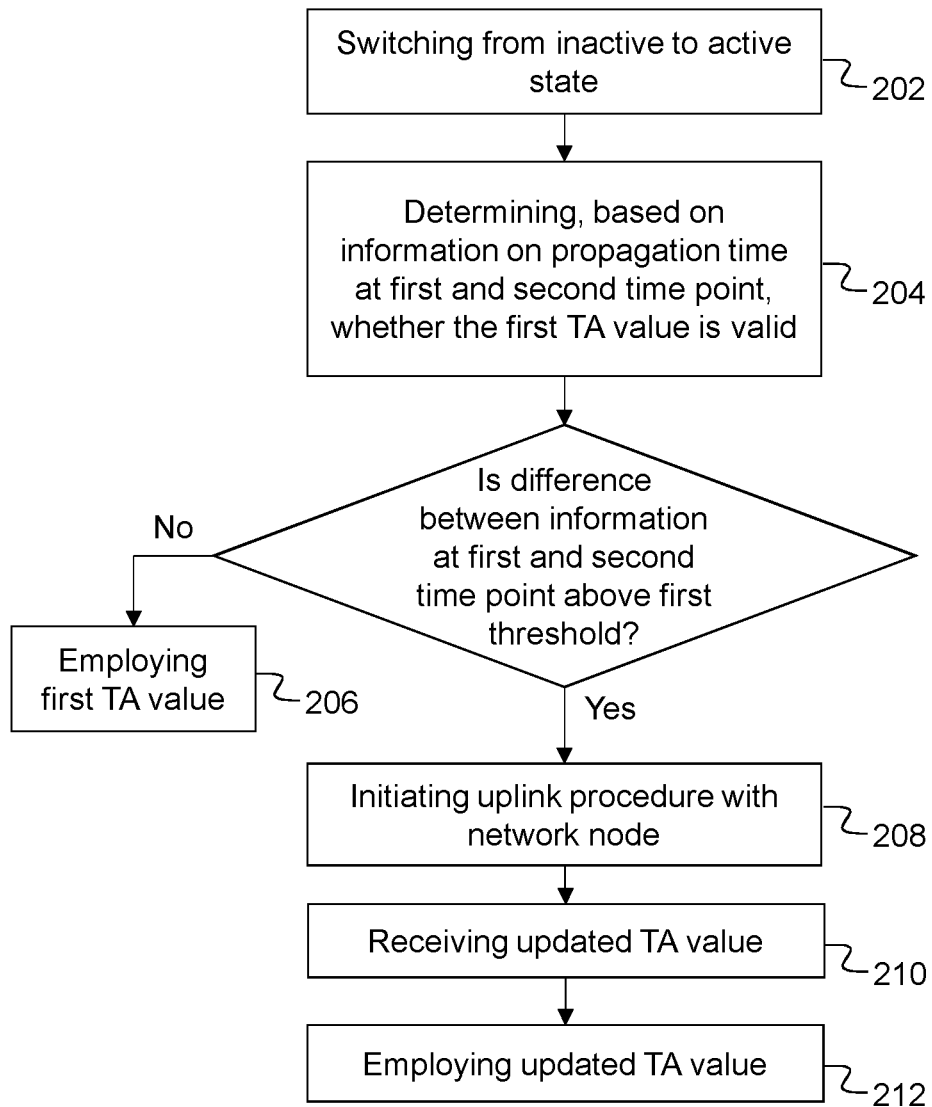
FIG. 4a-4b are other flow charts illustrating methods performed by a wireless communication device, according to possible embodiments.

FIG. 4a shows an alternative embodiment of the embodiment of FIG. 3, wherein the steps with the same reference number in the two figures corresponds to same or similar steps of the method. According to an embodiment, shown in FIG. 4a and in FIG. 4b and FIG. 5, the determining 204 whether the first TA value is still valid is performed based on a difference between information related to propagation time between the communication device and the network node at the first time point and information related to propagation time between the communication device and the network node at a second time point after the obtaining of the indication of data transfer.

"Information related to propagation time between the communication device and the network node" signifies information relating to the time it takes for radio signals to propagate from the communication device to the network node (or vice versa). The information related to propagation time between the communication device and the network node will in the following also shortly be called "information related to propagation time". Information related to propagation time may comprise measurements of time delay from sending of a signal from one or more network nodes until receiving the signal at the communication device, at the first time point and at the second time point, and optionally also at one or more time points in between the first and the second time point. Alternatively, the information related to propagation time may comprise the first TA value and a TA value estimated for the second time point. The information related to propagation time may be information related to the distance between the communication device and the network node. The information related to propagation time may comprise movement data from communication device internal sensors, such as accelerometers. The information related to propagation time may comprise communication device position information such as GPS location information data, at the first time point and at the second time point. The information related to propagation time may comprise knowledge of a mobility state of the communication device, e.g. its moving direction, its moving speed etc. As stated above, the communication device determines whether to obtain an updated TA value or to reuse the first TA value based on information related to propagation time at the time point when the first TA value was determined and at a second time point. In other words, if the distance from the communication device to the network node has not changed much from the first time point to the second time point, the same TA value that was used earlier can be reused at the second time point. The second time point is a time point occurring after obtaining the indication of data transfer that in its turn triggers the switching 202 from inactive to active state. In an embodiment, the second time point is a time point occurring after the switching (202) from inactive to active state.

Figure 4B:
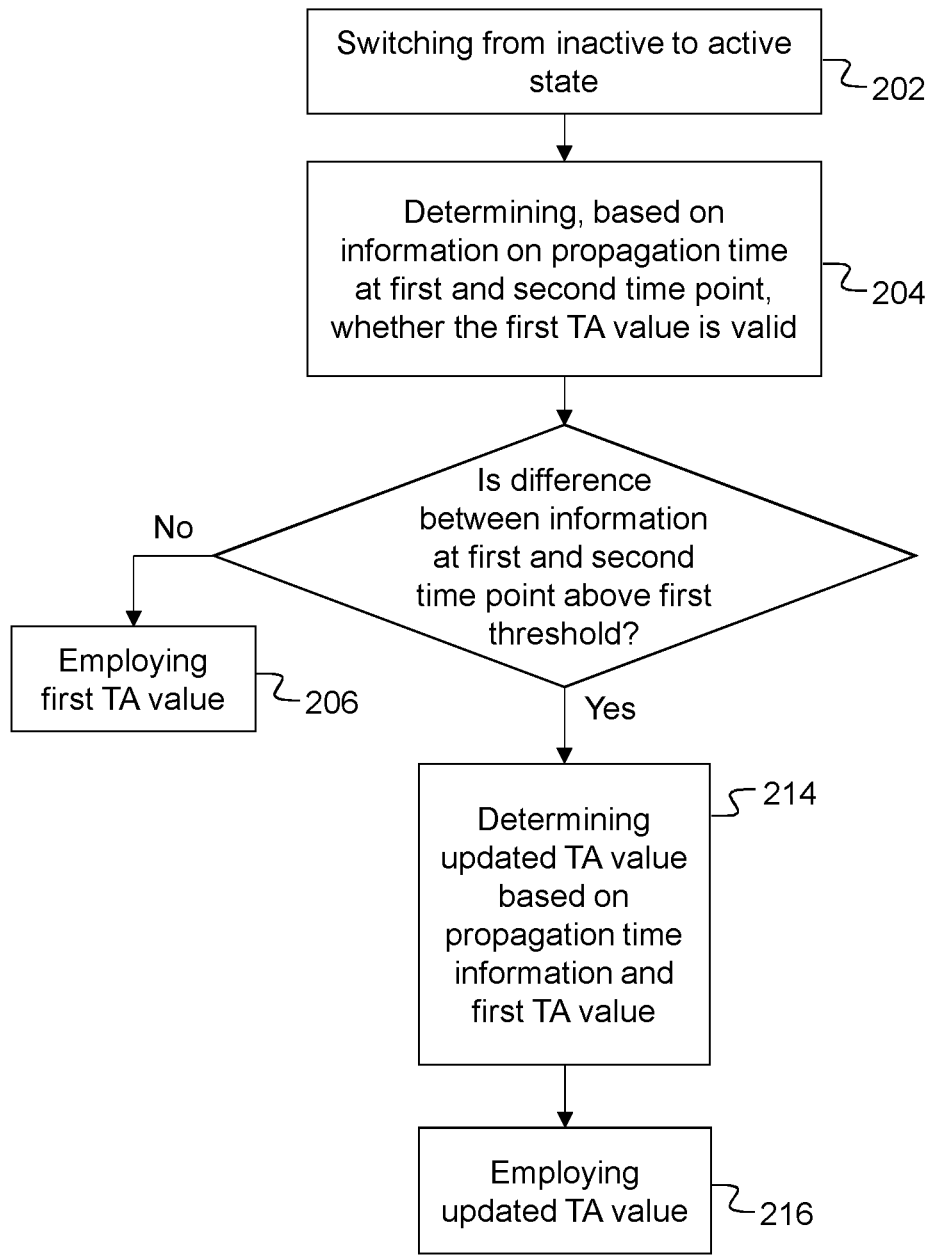
Figure 5:
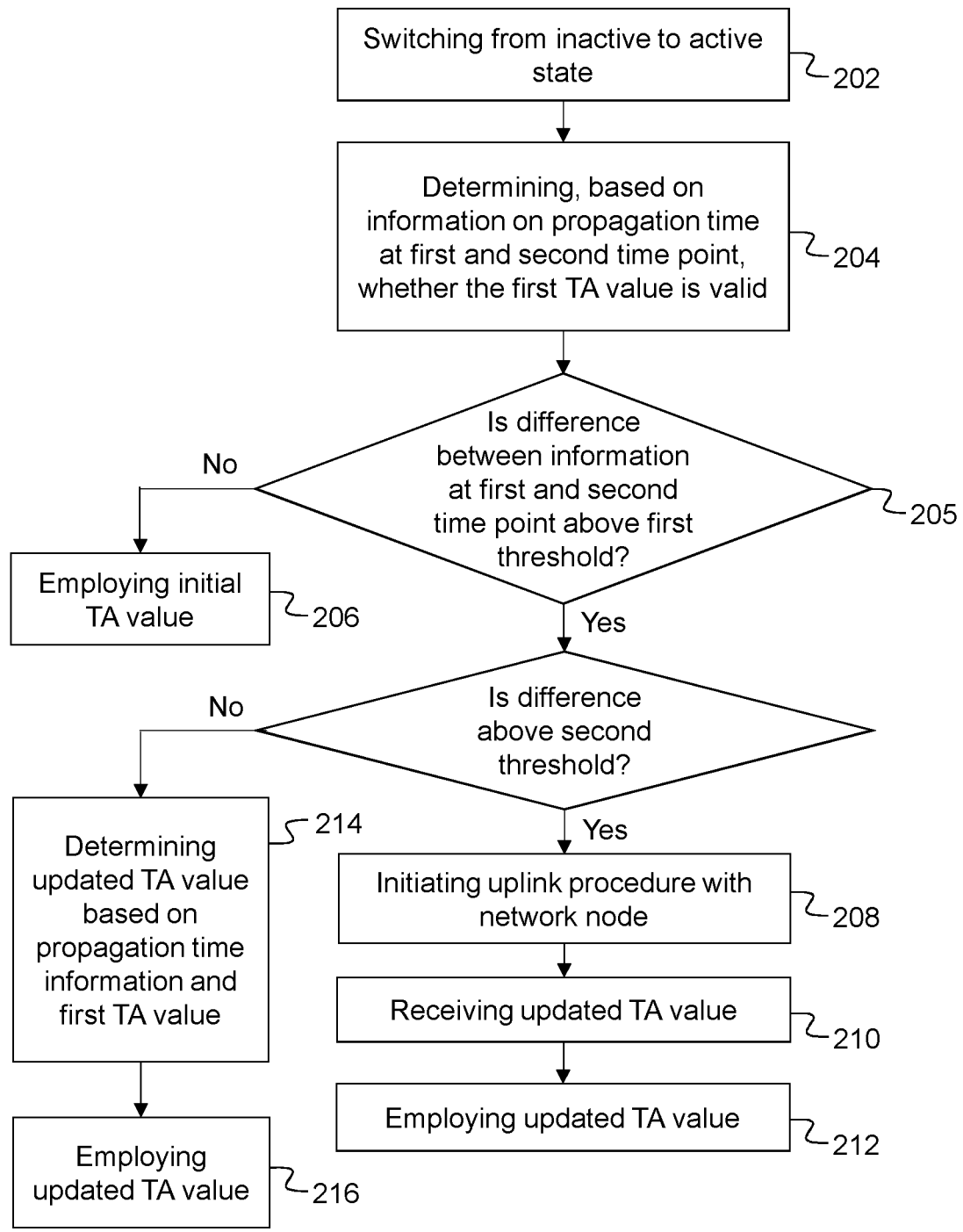
FIG. 5 is another flow chart illustrating another method performed by a wireless communication device, according to possible embodiments.

According to another embodiment also shown in FIGS. 4a, 4b and 5, when the difference between the information related to propagation time at the first time point and the information related to propagation time at the second time point is lower than a first threshold, the first TA value is employed 206 for sending data to the network node. By setting such a threshold value, unnecessary determining of new TA values can be avoided. Hereby processing power at the communication device is saved.

According to another embodiment, shown in FIG. 4a, when the difference between the information related to propagation time at the first time point and the information related to propagation time at the second time point is above the first threshold, obtaining the updated TA value by initiating 208 a RACH procedure or other uplink signal transmission procedure with the network node, and, in response to the initiated RACH procedure or other uplink signal transmission procedure, receiving 210 the updated TA value from the network node. By using a RACH procedure or other similar uplink signal transmission procedure for updating the TA value when the TA value is determined to have changed above the first threshold, a good update of TA value is obtained above the threshold, e.g. for larger position changes of the device. As a result of the initiated RACH procedure, or other similar uplink signal transmission procedure, the communication device may receive 210 the updated TA value from the network node and employ 212 the updated TA value for sending data uplink to the network node. In FIG. 4a, the steps of initiating 208, receiving 210 and employing 212 corresponds to the employing-step 207 of FIG. 3.

FIG. 4b shows an alternative embodiment of FIGS. 3 and 4a, wherein the steps with the same reference numbers in the different figures corresponds to same or similar steps of the method. In the embodiment of FIG. 4b, when the difference between the information related to propagation time at the first time point and the information related to propagation time at the second time point is above the first threshold, the updated TA value is obtained by determining 214 the updated TA value based on the information related to propagation time at the first time point, the information related to propagation time at the second time point, and on the first TA value. Thereafter, the updated TA value is employed 216. In FIG. 4b, the steps of determining 214 and employing 216 corresponds to the employing-step 207 of FIG. 3. Hereby, an internal TA value determining method is performed at the communication device and a RACH procedure is avoided for updating the TA value, which sets network resources free that would otherwise have been used for the RACH procedure. Also, by the UE internally determining the present TA value, the load of the PRACH is lowered and can be used by other UEs. In addition, a TA-value updated in such a way is obtained quicker than a TA-value received from the network node in a RACH procedure, resulting in that the communication device can send data at an earlier time point after waking up than what is possible if a RACH procedure would have been used for the updating of the TA value.

FIG. 5 shows an alternative embodiment of the embodiments of FIGS. 3 and 4, wherein the steps with the same reference numbers in the different figures corresponds to same or similar steps of the method. In the alternative embodiment of FIG. 5, there are two different thresholds, a first and a second threshold that is higher than the first threshold. According to this embodiment, when the difference between the information related to propagation time at the first time point and the information related to propagation time at the second time point is above the first threshold, and below a second threshold, higher than the first threshold the method further comprises obtaining the updated TA value by determining 214 the updated TA value based on the information related to propagation time at the first time point, the information related to propagation time at the second time point, and on the first TA value. The determined updated TA value is then employed 216. Further. when the difference between the information related to propagation time at the first time point and the information related to propagation time at the second time point is above the second threshold, the method further comprises obtaining the updated TA value by initiating 208 a RACH procedure or other uplink signal transmission procedure with the network node, and, in response to the initiated RACH procedure or other uplink signal transmission procedure, receiving 210 the updated TA value from the network node. Thereafter, the updated TA value is employed 212.

When the propagation time difference is higher than the first threshold, but lower than the second threshold the communication device determines itself a TA value to be used. In other words, an internal TA value determining method is performed at the communication device and a RACH procedure is avoided for updating the TA value, which sets network resources free that would otherwise have been used for the RACH procedure. Further, by using an uplink transmission procedure when above the second threshold, a valid TA value is assured for large propagation time differences. In FIG. 5, the steps of initiating 208, receiving 210 and employing 212 corresponds to the obtaining and employing-step 207 of FIG. 3.

According to an embodiment, the determined update TA value may be communicated to the network node.

According to another embodiment, when the first TA value is determined not to be valid, the method further comprises determining the updated TA value based on a measurement of reception time for a downlink synchronization signal sent from the network node at approximately a second time point after the obtaining of the indication of data transfer, a measurement of reception time for a downlink synchronization signal sent from the network node at approximately the first time point, a time interval between consecutively transmitted synchronization signals and a number of transmitted downlink synchronization signals between the first time point and the second time point.

Figure 7:
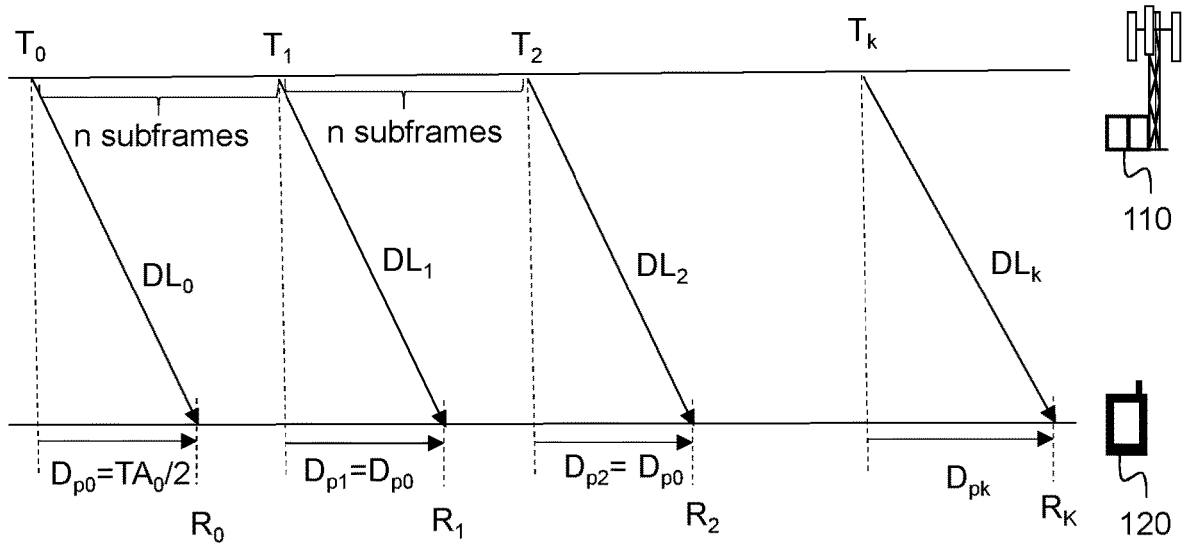
FIG. 7 is a signaling scenario illustrating an embodiment of calculating a TA value based on information on propagation time.

Different implementations of such an embodiment are described in relation to FIG. 7.

When the communication device knows reception times for the synch signals received at the first time point and the second time point as well as the number of synch signals it has received and the time interval between two consecutive synch signals, it can calculate the delay for sending downlink synch signals at the second time point and use that as a measure for determining the TA value at the second time point.

According to another embodiment, the determining 204 whether the first TA value is still valid comprises determining a first difference between, a propagation time for a downlink signal sent from the network node 110 to the communication device 120 at approximately the first time point and a propagation time for a downlink signal sent from a second network node 150 to the communication device 120 at approximately the first time point, determining a second difference between a propagation time for a downlink signal sent from the network node 110 to the communication device 120 at a second time point after the obtaining of the indication of data transfer and a propagation time for a downlink signal sent from the second network node 150 to the communication device 120 at the second time point, and determining a third difference between the first difference and the second difference, and when the third difference is below a third threshold, the first TA value is determined to be valid, and when the third difference is above the third threshold the first TA value is determined not to be valid.

By such a method, a possible time drift of the internal clock of the communication device can be compensated for by analyzing the difference between the difference of propagation time of a DL signal from the first and the second network node at the first time point and the difference of propagation time of a DL signal from the first and the second network node at the second time point. The DL signal may be a DL synchronization signal.

According to another embodiment, the determining 204 whether the first TA value is still valid is based on a position measurement for the communication device at approximately the first time point and a position measurement for the communication device at approximately a second time point after the obtaining of the indication of data transfer. The position measurement may be performed via a GPS based method, i.e. from a GPS sensor arranged in the communication device.

According to another embodiment, the determining 204 whether to obtain and employ an updated TA value or to employ the first TA value is based on a movement measurement performed by a movement indicator of the communication device at approximately the first time point and at approximately the second time point. The movement indicator may an acceleration measurement of an accelerometer or an indication of mobility state of the communication device.

According to another embodiment, the method is triggered in response to receiving an instruction from the network node to perform the method. According to an alternative, the instruction is received when the communication device is in the active state.

Figure 6:
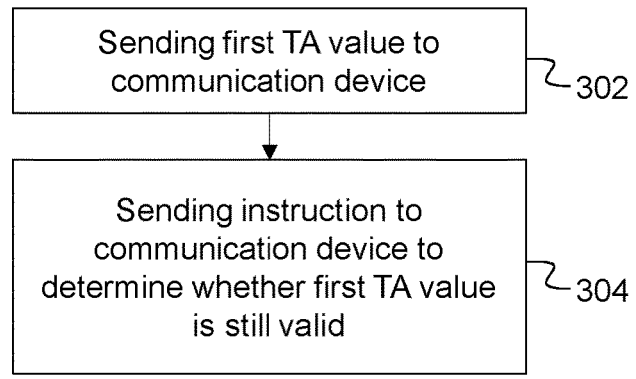
FIG. 6 is a flow chart illustrating a method performed by a network node, according to possible embodiments.

FIG. 6, in conjunction with FIG. 2, shows a method performed by a network node 110 of a wireless communication network 100, for enhancing wireless communication with a communication device 120. The method comprises sending 302, to the communication device, a first TA value at a first time point when the communication device is in active state, and sending 304, at a time point later than the first time point, an instruction to the communication device to determine whether the first TA value is still valid, and to employ the first TA value for sending data to the network node in accordance with the determination.

According to an embodiment, the instruction may comprise an instruction to the communication device to employ the first TA value for sending data to the network node when the first TA value is determined to be valid, and to employ an updated TA value for sending data to the network node when the first TA value is determined not to be valid.

The instruction can be sent anytime when the communication device is active during its life time. Upon the reception of this instruction, the communication device starts to use the proposed method. The instruction can be sent via either broadcasting signaling or dedicated signaling.

According to an embodiment, the sending 304 of the instruction to the communication device is triggered in response to an indication of a load of the communication network above a certain threshold. The load of the communication network could be a capacity usage of a wireless communication interface between the communication device and the network node above a certain threshold, e.g. 60-70% of maximum capacity.

In the following, an embodiment of an efficient RACH-less UL sync procedure is proposed, which is especially useful for small data transfer. When applying this embodiment for the small data transfer in RRC connected inactive state, the signaling overhead is further reduced, and the data transmission latency is further decreased. While in the inactive state, the communication device, hereinafter called the UE, monitors its movement status. The UE then determines whether the existing TA is still valid, and if so, omits the conventional RA procedure for receiving a TA update.

More specifically, the proposed procedure is triggered when the UE switches from inactive state to active state in order to transmit or receive data, e.g. small data. Instead of always using a regular random access procedure, based on the RACH, or other uplink synchronization signaling transmission to re-obtain UL sync, the UE determines autonomously whether or not it is necessary to adjust its TA value using the random access procedure, or if the existing TA value could be reused. As an extension, the UE may locally adjust its TA value without resorting to the random access procedure if the TA change is not negligible but still "small". This local adjustment of the TA value may be performed by e.g. using DL synchronization signal measurements and/or historic TA values. The estimated movement status information that is used by the UE for the decision of whether a TA update is needed may include knowledge of the UE's mobility state, measurements of DL synchronization signals of one or multiple neighboring network access nodes, internal sensor data, GPS location information, etc.

Signaling to enable the RACH-less UL synchronization procedure. The network node 110 (see FIG. 2), or any other node in the communication network 100 that sends instructions to the network node 110 that the network node 110 sends further to the UE 120, may determine when the UE is to activate the RACH-less UL synchronization procedure. The network node 110 could use several criteria to determine whether or not to apply the UL synchronization procedure of the embodiment, such as network load. For example, when the load of the communication network, or specifically the load of the network node 110, exceeds a certain limit, e.g. 60-70% of its maximum capacity, the network node determines that it is time to use the RACH-less UL synchronization procedure, and signals an instruction to the UE to start using the procedure. The network node 110 can signal to the UE 120 via broadcasting signaling or dedicated signaling, to enable the RACH-less UL synchronization procedure. The signaling is done when the UE is in active state.

In the following, different embodiments how to implement the RACH-less UL synchronization is presented. Within the scope of the presented invention, there are several alternative ways to discover if the UE still has a valid TA value, or if the TA value needs to be updated, and optionally how to adjust the TA value to enable UL synchronization without resorting to random access.

According to a first embodiment, signals from a single network node 110 is used by the UE to determine whether the TA value needs to be updated or not. In this embodiment, the UE obtains an initial TA value from its initial random access procedure when in an active state at a first active state period. The UE then keeps this initial TA value for subsequent active state periods. One active state period is when the UE switches from active state to passive state and back to active state again. For subsequent active state periods, the UE can, according to an alternative, autonomously adjust its TA value relative to its initial TA value, or the previously used TA value, by estimating how much the TA value has changed using measurements of the downlink synchronization signals.

In a first use case, the UE determines at a second current time point that no TA update is needed. In other words, the UE determines to use the initial TA value (or, if updated, the latest used TA value), in the current active period. The UE determines that no TA update is needed based on a difference between information related to propagation time between the communication device and the network node at a first time point when the latest used TA value was determined and information related to propagation time between the communication device and the network node at a second current time point. This first use case may be based on several alternative reasons. One reason is that the UE has not moved since the first time point. Another reason is that the UE moves slowly so that the distance change towards the network node does not lead to a TA update, e.g., the distance change is less than the TA update granularity of 78 m. Yet another example is that the UE moves back to one previous location so that the previous TA value can be applied directly.

In a second use case, the UE determines at the second current time point that the TA value needs to be updated and updates the TA value using DL measurements. This is the case when TA update is necessary since the propagation delay of signals sent between the UE 120 and the network node 110 has changed to a certain extent so that the previously used TA value is not valid any more. The change of the propagation delay could be due to several reasons, such as UE mobility, changes of the signal propagation paths, oscillator drift in the UE or the Doppler shift etc. The UE can periodically monitor the DL synchronization signals to detect changes of the DL propagation delay.

In one embodiment, the changes of the propagation delay are estimated by comparing the received DL sub-frames for consecutive transmissions of DL synchronization signals. An example is illustrated in FIG. 7. In FIG. 7, DLi, i=0 to k symbolizes consecutively sent DL signals, sent with a mutual time difference equal to the time difference between n subframes. Ti, i=0 to k, is the transmission time point for when each DL signal is sent from the network node 110, Ri, i=0 to k, is the reception time point for when each DL signal is received by the communication device 120. DLi is symbolized with arrows directed from Ti to Ri. Dpi, i=0 to k is the propagation time from transmitting one DL signal from Ti to Ri. In this example, the UE acquires the initial TA value denoted as $TA_0$ via a RACH access procedure at time point before $R_0$ (see FIG. 7). $TA_0$ is assigned by the network node 110 in a random access response, RAR, message based on measurements performed by the network node of UL transmissions of e.g. the PRACH preamble. The UE 120 then keeps this TA value for a certain time while in active state. UE also starts to monitor the possible TA update from time point $R_0$. Then the UE switches down to the inactive state due to inactivity. When the UE is in the inactive state again, the UE keeps the TA value obtained in its latest active period. The UE monitors the DL synchronization signals during its active period during each discontinuous reception, DRX, cycle. When it is time for the UE to transmit/receive the next small packet, the UE has to re-obtain UL synchronization. It is assumed that the network node 110 periodically transmits DL synchronization signals, therefore the UE 120 will know the exact ordinal number for the detected DL synchronization signal. For example, in FIG. 7, the UE 120 detects the DL synchronization signal at the time Rk, which synchronization signal was transmitted by the network node 110 at the time Tk. The UE 120 is able to estimate the DL propagation delay Dpk for this signal according the equation (2)

$$Dpk = (Rk - T0 - k \times n \times \text{sub\_frame\_length}) \quad (2)$$
$$= (Rk - (R0 - Dp_0) - k \times n \times \text{sub\_frame\_length})$$
$$= (Rk - (R0 - TA_0/2) - k \times n \times \text{sub\_frame\_length}),$$

where Ti, i=1 to k is the transmission time point for each DL signal $DL_i$, i=1 to k, Ri, i=1 to k is the reception time point for each DL signal $DL_i$, i=1 to k, Dpi, i=1 to k the transmission time from the transmission time point Ti to the reception time point Ri for each DL signal $DL_i$, i=1 to k. The new TA value denoted as $TA_k$ is calculated further as $$TAk = 2*Dpk \quad (3)$$

as the DL transmission time is expected to be the same as the UL transmission time.

The procedure described in equation (2) and (3) assumes that the internal clock of the UE 120 is accurate and the timing drift is negligible. The procedure described is therefore especially applicable when the UE's internal timing reference in the inactive state maintains high accuracy. The procedure described in equation (2) and (3) is valid even if the UE has done cell re-selection to a new cell that may be run by another network node, such as network node 150 of FIG. 2. However, in this case the DL synchronization signal from the new cell is to be used, and the timing difference between the new cell and the serving cell is also considered, if both cells are synchronized. If the new cell is not synchronized with the serving cell, the UE has to perform the RA procedure instead.

According to a second embodiment, signals from multiple network nodes 110, 150 (see FIG. 2) are used by the UE to determine whether the TA value needs to be updated or not. In case the UE has spent a longer time in the inactive state, it is common that its internal timing has been maintained using a less accurate clock to reduce power consumption. This may bias the $TA_k$ with an amount corresponding to the clock drift. For low-cost local oscillators operating open loop, without tracking a network node, the absolute timing reference estimate may become unusable in a few seconds.

To reliably determine whether the true TA has changed after a longer inactive state duration, instead of monitoring the absolute timing reference, timing reference differences with respect to several network nodes with stable clocks may be monitored.

Denote the estimated timing offset of the UE with respect to network node m at measurement time k by $D_{m,k}$. Timing reference difference for a first network node 110 and a second network node 150 at time k is denoted as $\Delta_k = D_{2,k} - D_{1,k}$. If the change in the difference exceeds a threshold t as defined in equation (4), $$|\Delta_k - \Delta_{k-1}| > t, \qquad (4)$$

a TA update is required.

If the first and second network nodes 110, 150 are unsynchronized, the relative clock drift of the individual network nodes also limits the validity of the timing reference difference monitoring. The 3GPP spec mandates that a network node, such as a macro eNodeB, must maintain a local frequency reference accuracy within 0.05 ppm of the nominal. Then two eNodeBs will drift max 1 us per 10 s (this is worst case, typical drift is much less at stable temperatures). Therefore, with up to 5 s DRX cycle, a UE entering active mode and observing that its DL timing difference with respect to two network nodes has not changed more than 0.5 us knows that it is still at approximately the same physical location from the node and the old TA is valid. If the difference is above 0.5 us, the UE should obtain a new TA. For longer DRX cycles, the timing difference change may be due to either frequency drift or physical movement, so a new TA may be obtained to ensure robustness.

The above reasoning assumes that the frequency references of the network nodes drift independently. However, if the network deployment includes synchronization between the network nodes, even "loose", e.g. within 1 or 5 ms, then there is a common frequency stabilization mechanism that avoids a rapid inter network node timing drift. In that case, the worst-case drift is expected to be negligible compared to the above example. In this latter case, the inter network node DL timing difference can therefore be used as an indicator of whether a UE is "static" over much longer DRX cycles.

To further increase the robustness of differential timing tracking, the UE may track relative DL timings with respect to three or more network nodes, to avoid misleading indications in pathological movement trajectories. If any of the pairwise changes exceed a threshold, a TA update is performed.

According to a third embodiment internal sensors at the UE are used by the UE to determine whether the TA value needs to be updated or not. In addition to the radio-based solutions above, UE internal sensors, such as accelerometers may be used as movement indicators. If the internal sensors would indicate movement since the last TA update, it is a signal to the UE that the TA value needs to be updated. Oppositely, if the internal sensors would indicate no movement since last TA update, the previous TA value can be reused. In an alternative, dead-reckoning may be used over shorter distances to determine the extent of the movement. In another alternative, Global positioning System, GPS, or other similar types of positioning systems may be used to determine whether the UE has moved since the last TA update or not. If the GPS indicates no or a very short movement, the previous TA may be reused, and otherwise the TA needs to be updated.

Figure 8:
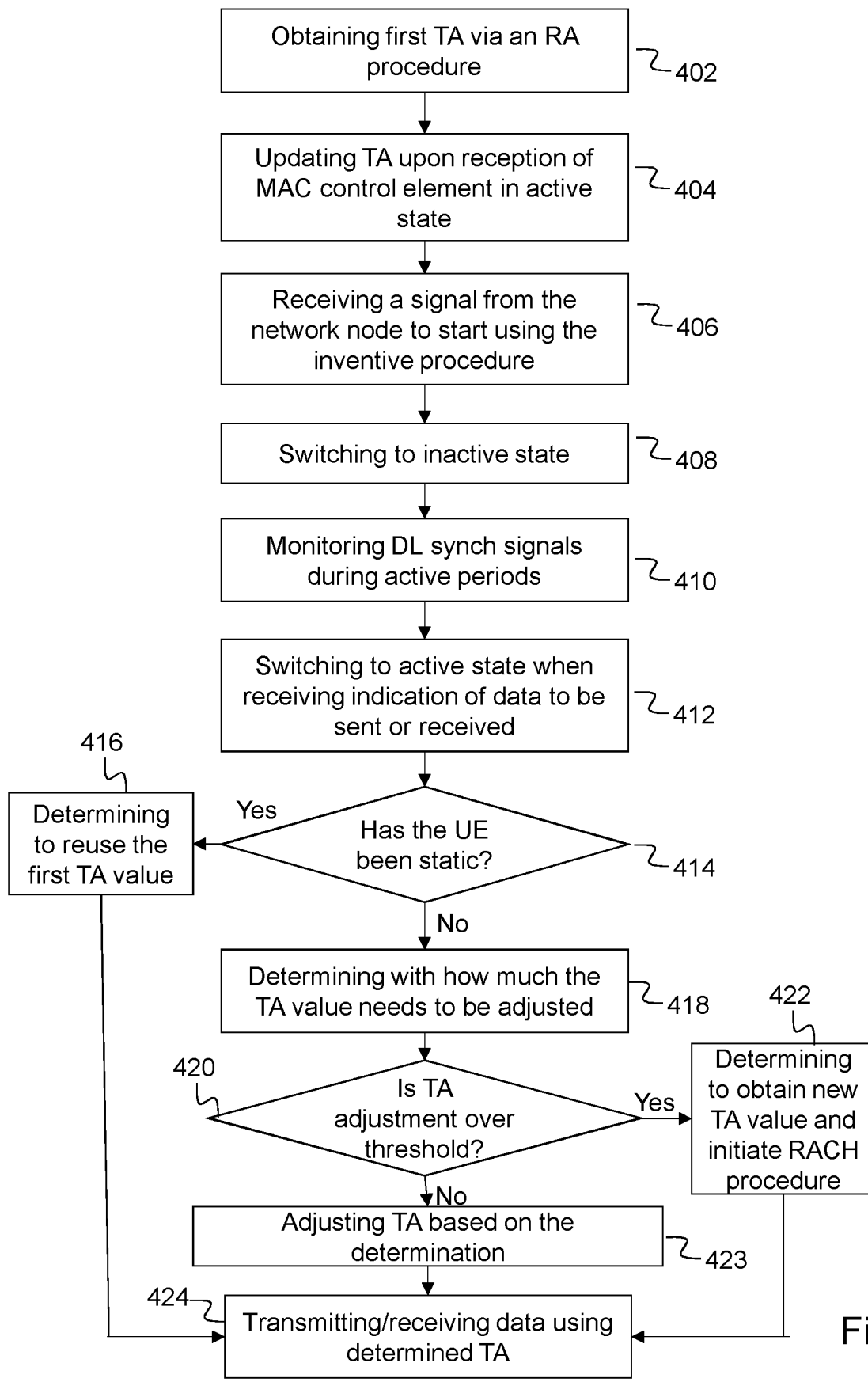
FIG. 8 is a flow chart illustrating methods according to possible embodiments.

FIG. 8 shows a flow chart describing an example embodiment of a method performed by a UE. The method starts by the UE obtaining 402 a first TA value from the network node via an RA procedure. Thereafter, the UE updates 404 the TA value upon reception of a MAC control element in a RAR message when the UE is in active state. The UE then receives 406, when in active state, a signal from the network node that it can start to use the procedure of determining whether the TA value can be reused or whether it should be updated, instead of using the prior art random access updating procedure. The UE then switches 408 to inactive state. The UE monitors 410 the DL synchronization signal during active periods of the inactive state (e.g. the duration of "ON" time during each DRX cycle). Thereafter, when the UE receives an indication that new data is to be sent or received, the UE switches 412 to active state. The indication of new data to be sent, may be, for UL, that a buffer of the UE indicates that there is data to be sent to the network node, or for DL, that a signal from the network node, in e.g. a paging signal, indicates that the network node has data to send to the UE. Thereafter, the UE determines 414 whether it has been static or not since it received the TA update. This determination may be performed according to any of the alternatives describes in the previous embodiments, e.g. based on UE internal movement sensors or based on measurements of signal strength or propagation delay of signals sent from one or more network nodes at a first time point approximately when the update TA value was received and at a second, current time point. If the UE determines 414 that it has been more or less static since it received the first TA value (or the updated TA value in step 404), the UE determines 416 to reuse the first TA value. Thereafter, data is transmitted/received 424 using the reused first TA value. On the other hand, if the UE determines 414 that it has moved considerably since it received the first TA value, the UE determines 418 with how much the TA value needs to be adjusted, based on a difference between information related to propagation time at the first time point and on information related to propagation time at the second time point. As mentioned earlier, such information may be taken from measurements of the position of the UE, or on measurements on DL signals, such as DL synch signals at the first and second time point, i.e. without performing any RACH procedure. When this determination shows 420 that the necessary TA adjustment is over a certain threshold, the UE determines 422 that a new TA value needs to be obtained from the network node and initiates a regular RACH procedure. Thereafter, data is transmitted/received 424 using the obtained new TA value. When, on the other hand, this determination shows 420 that the necessary TA adjustment is below the certain threshold, the UE adjusts 423 the TA based on the determined 418 TA value adjustment, and thereafter transmits/receives 424 the data using the adjusted TA value.

Figure 9:
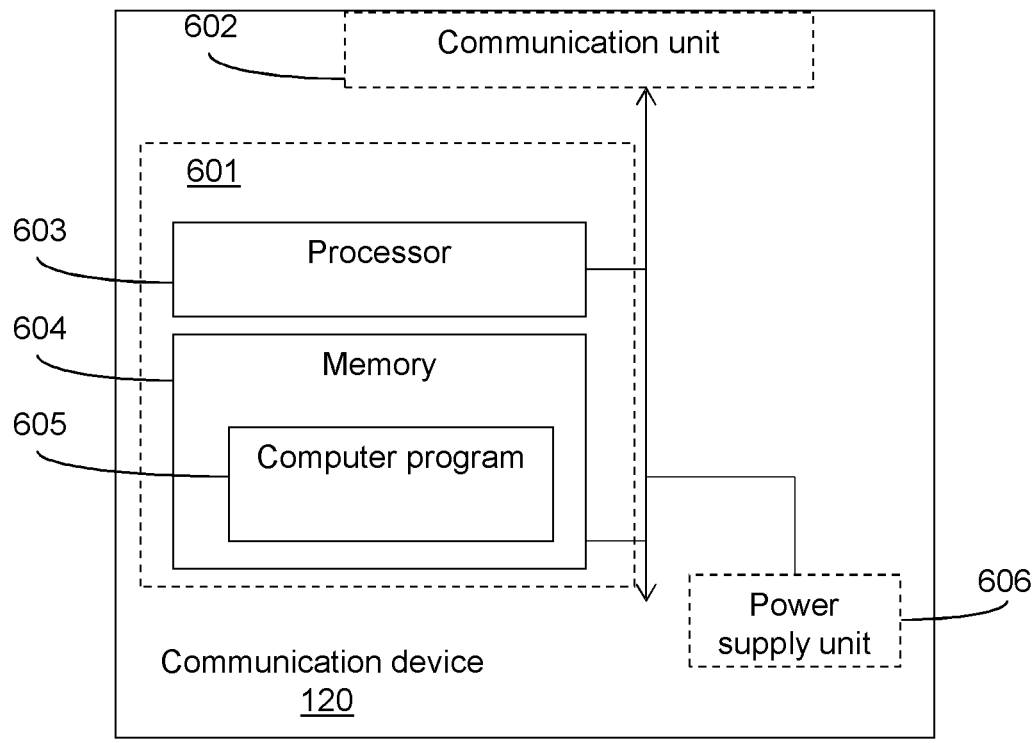
FIGS. 9-10 are block diagrams illustrating a wireless communication device in more detail, according to further possible embodiments.

FIG. 9, in conjunction with FIG. 2, shows a communication device 120 operable for communication with a network node 110 of a wireless communication network 100. Further, the communication device 120 has received, from the network node, a first timing advance, TA, value at a first time point when in active state, and the communication device has thereafter switched to inactive state. The communication device 120 comprises a processor 603 and a memory 604. The memory contains instructions executable by said processor, whereby the communication device 120 is operative for switching from inactive to active state, after obtaining an indication of data transfer, determining whether the first TA value is still valid, employing the first TA value for sending data to the network node when the first TA value is determined to be valid, and employing an updated TA value for sending data to the network node when the first TA value is determined not to be valid.

According to an embodiment, the communication device is operative for determining whether the first TA value is still valid based on a difference between information related to propagation time between the communication device 120 and the network node 110 at the first time point and information related to propagation time between the communication device and the network node at a second time point after the obtaining of the indication of data transfer.

According to another embodiment, the communication device is operative for employing the first TA value for sending data to the network node 110 when the difference between the information related to propagation time at the first time point and the information related to propagation time at the second time point is lower than a first threshold.

According to another embodiment, the communication device is operative for obtaining the updated TA value by initiating a RACH procedure or other uplink signal transmission procedure with the network node and, in response to the initiated RACH procedure or other uplink signal transmission procedure, receiving the updated TA value from the network node, when the difference between the information related to propagation time at the first time point and the information related to propagation time at the second time point is above a first threshold.

According to another embodiment, the communication device is further operative for obtaining the updated TA value by determining the updated TA value based on the information related to propagation time at the first time point, the information related to propagation time at the second time point, and on the first TA value, when the difference between the information related to propagation time at the first time point and the information related to propagation time at the second time point is above a first threshold.

According to another embodiment, the communication device is further operative for obtaining the updated TA value by determining the updated TA value based on the information related to propagation time at the first time point, the information related to propagation time at the second time point, and on the first TA value, when the difference between the information related to propagation time at the first time point and the information related to propagation time at the second time point is above a first threshold and below a second threshold, higher than the first threshold. The communication device is further operative for obtaining the updated TA value by initiating a RACH procedure or other uplink signal transmission procedure with the network node, and, in response to the initiated RACH procedure or other uplink signal transmission procedure, receiving the updated TA value from the network node, when the difference between the information related to propagation time at the first time point and the information related to propagation time at the second time point is above the second threshold.

According to another embodiment, the communication device is further operative for determining the updated TA value based on a measurement of reception time for a downlink synchronization signal sent from the network node at a second time point after the obtaining of the indication of data transfer, a measurement of reception time for a downlink synchronization signal sent from the network node at approximately the first time point, a time interval between consecutively transmitted downlink synchronization signals and a number of transmitted downlink synchronization signals between the first time point and the second time point, when the first TA value is determined not to be valid.

According to another embodiment, the communication device is operative for determining whether the first TA value is still valid by determining a first difference between a propagation time for a downlink signal sent from the network node 110 to the communication device 120 at approximately the first time point and a propagation time for a downlink signal sent from a second network node 150 to the communication device 120 at approximately the first time point, by determining a second difference between a propagation time for a downlink signal sent from the network node 110 to the communication device 120 at a second time point after the obtaining of the indication of data transfer and a propagation time for a downlink signal sent from the second network node 150 to the communication device 120 at the second time point, and by determining a third difference between the first difference and the second difference, and when the third difference is below a third threshold, the first TA value is determined to be valid, and when the third difference is above the third threshold the first TA value is determined not to be valid.

According to another embodiment, the communication device is operative for determining whether the first TA value is still valid based on a position measurement for the communication device at approximately the first time point and a position measurement for the communication device at approximately a second time point after the obtaining of the indication of data transfer.

According to another embodiment, the communication device is operative for determining whether the first TA value is still valid based on a movement measurement performed by a movement indicator of the communication device at approximately the first time point and at approximately a second time point after the obtaining of the indication of data transfer.

According to another embodiment, the communication device is operative for triggering the switching from inactive to active state, after obtaining an indication of data transfer, the determining of whether the first TA value is still valid, the employing of the first TA value for sending data to the network node when the first TA value is determined to be valid, and the employing of an updated TA value for sending data to the network node when the first TA value is determined not to be valid, in response to receiving an instruction from the network node.

According to other embodiments, the communication device 120 may further comprise a communication unit 602, which may be considered to comprise conventional means for wireless communication from and/or to other nodes in the wireless network 100, such as the network node 110. The communication unit 602 may comprise transmitting units for transmitting wireless signals and receiving units for receiving wireless signals. The instructions executable by said processor 603 may be arranged as a computer program 605 stored e.g. in said memory 604. The processor 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the actions and/or methods mentioned above. The wireless device may further comprise a power supply unit 606, such as a battery, for providing the wireless device with electrical power.

The computer program 605 may comprise computer readable code means, which when run in the communication device 120 causes the communication device to perform the steps described in any of the described embodiments of the communication device. The computer program 605 may be carried by a computer program product connectable to the processor 603. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the communication device has access via the communication unit 602. The computer program may then be downloaded from the server into the memory 604.

Figure 10:
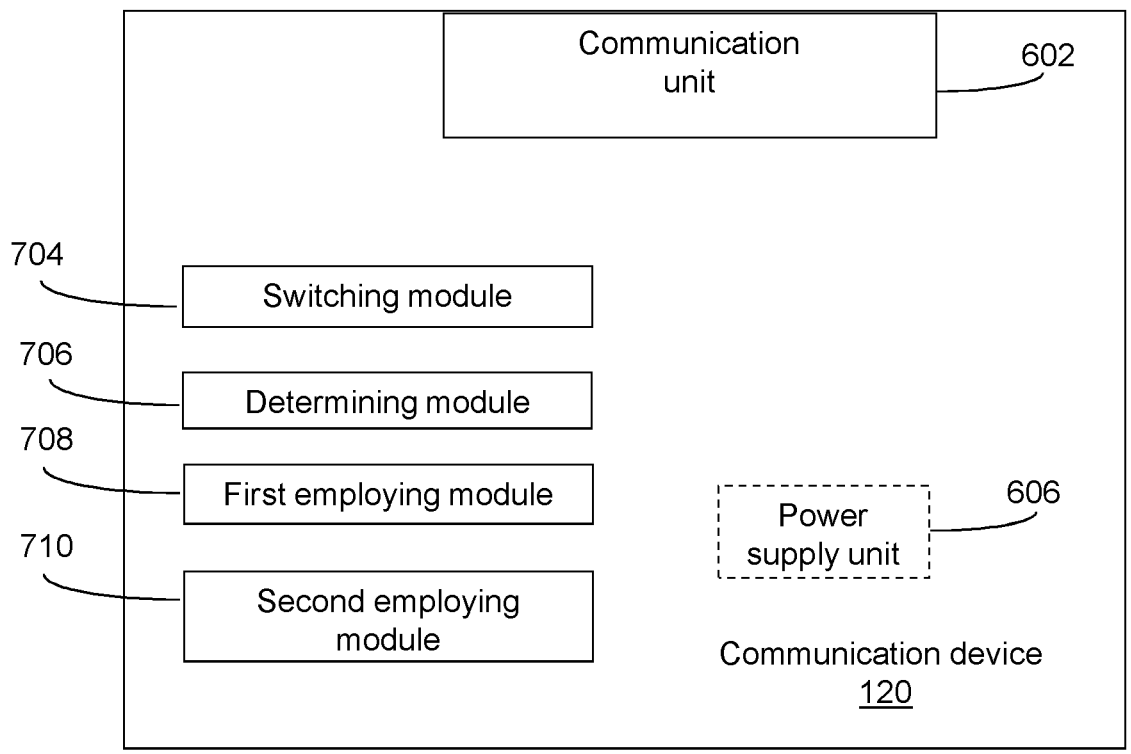

FIG. 10, in conjunction with FIG. 2, shows another embodiment of a communication device 120 operable for communication with a network node 110 of a wireless communication network 100. The communication device 120 has received, from the network node, a first timing advance, TA, value at a first time point when in active state, and the communication device has thereafter switched to inactive state. The communication device 120 comprises a switching module 704 for switching from inactive to active state, after obtaining an indication of data transfer, a determining module 706 for determining whether the first TA value is still valid, a first employing module 708 for employing the first TA value for sending data to the network node when the first TA value is determined to be valid, and a second employing module 710 for employing an updated TA value for sending data to the network node when the first TA value is determined not to be valid.

According to an embodiment, the determining module 706 is operative for determining whether the first TA value is still valid based on a difference between information related to propagation time between the communication device 120 and the network node 110 at the first time point and information related to propagation time between the communication device and the network node at a second time point after the obtaining of the indication of data transfer.

According to an embodiment, the first employing module 708 is operative for employing the first TA value for sending data to the network node 110 when the difference between the information related to propagation time at the first time point and the information related to propagation time at the second time point is lower than a first threshold.

According to an embodiment, the communication device has a first obtaining module operative for obtaining the updated TA value by initiating a RACH procedure or other uplink signal transmission procedure with the network node and, in response to the initiated RACH procedure or other uplink signal transmission procedure, receiving the updated TA value from the network node, when the difference between the information related to propagation time at the first time point and the information related to propagation time at the second time point is above a first threshold.

According to another embodiment, the communication device has a second obtaining module operative for obtaining the updated TA value by determining the updated TA value based on the information related to propagation time at the first time point, the information related to propagation time at the second time point, and on the first TA value, when the difference between the information related to propagation time at the first time point and the information related to propagation time at the second time point is above a first threshold.

According to another embodiment, the communication device has a third obtaining module operative for obtaining the updated TA value by determining the updated TA value based on the information related to propagation time at the first time point, the information related to propagation time at the second time point, and on the first TA value, when the difference between the information related to propagation time at the first time point and the information related to propagation time at the second time point is above a first threshold and below a second threshold, higher than the first threshold. The third obtaining module is further operative for obtaining the updated TA value by initiating a RACH procedure or other uplink signal transmission procedure with the network node, and, in response to the initiated RACH procedure or other uplink signal transmission procedure, receiving the updated TA value from the network node, when the difference between the information related to propagation time at the first time point and the information related to propagation time at the second time point is above the second threshold.

According to another embodiment, the communication device has a second determining module operative for determining the updated TA value based on a measurement of reception time for a downlink synchronization signal sent from the network node at a second time point after the obtaining of the indication of data transfer, a measurement of reception time for a downlink synchronization signal sent from the network node at approximately the first time point, a time interval between consecutively transmitted downlink synchronization signals and a number of transmitted downlink synchronization signals between the first time point and the second time point, when the first TA value is determined not to be valid.

According to another embodiment, the communication device has a third determining module, operative for determining whether the first TA value is still valid by determining a first difference between a propagation time for a downlink signal sent from the network node 110 to the communication device 120 at approximately the first time point and a propagation time for a downlink signal sent from a second network node 150 to the communication device 120 at approximately the first time point, determining a second difference between a propagation time for a downlink signal sent from the network node 110 to the communication device 120 at a second time point after the obtaining of the indication of data transfer and a propagation time for a downlink signal sent from the second network node 150 to the communication device 120 at the second time point, and determining a third difference between the first difference and the second difference, and when the third difference is below a third threshold, the first TA value is determined to be valid, and when the third difference is above the third threshold the first TA value is determined not to be valid.

According to another embodiment, the communication device has a fourth determining module operative for determining whether the first TA value is still valid based on a position measurement for the communication device at approximately the first time point and a position measurement for the communication device at approximately a second time point after the obtaining of the indication of data transfer.

According to another embodiment, the communication device has a fifth determining module operative for determining whether the first TA value is still valid based on a movement measurement performed by a movement indicator of the communication device at approximately the first time point and at approximately a second time point after the obtaining of the indication of data transfer.

According to another embodiment, the communication device has a triggering module operative for triggering the switching from inactive to active state, after obtaining an indication of data transfer, triggering the determining of whether the first TA value is still valid, triggering the employing of the first TA value for sending data to the network node when the first TA value is determined to be valid, and triggering the employing of an updated TA value for sending data to the network node when the first TA value is determined not to be valid, in response to receiving an instruction from the network node.

Figure 11:
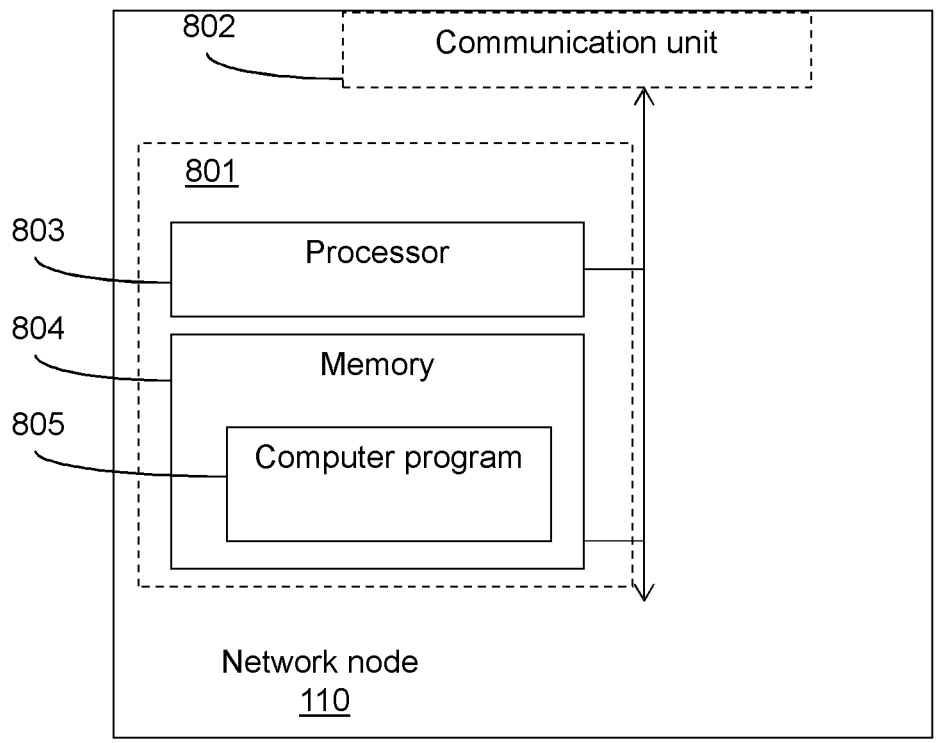
FIG. 11-12 are block diagrams illustrating a network node in more detail, according to further possible embodiments.

FIG. 11, in conjunction with FIG. 2, shows a network node 110 operable in a wireless communication system 100 configured for enhancing wireless communication with a communication device 120. The network node 110 comprising a processor 803 and a memory 804. The memory contains instructions executable by said processor, whereby the network node 110 is operative for sending, to the communication device, a first TA value at a first time point when the communication device is in active state, and sending, to the communication device, at a time point later than the first time point, an instruction to determine whether the first TA value is still valid, and to employ the first TA value for sending data to the network node in accordance with the determination.

According to an embodiment, the network node 110 is operable for triggering sending of the instruction to the communication device in response to an indication of a load of the communication network above a certain threshold.

According to other embodiments, the network node 110 may further comprise a communication unit 802, which may be considered to comprise conventional means for communicating with wireless communication devices, such as a transmitter and a receiver, or a transceiver, arranged for wireless communication. The communication unit 802 may further be arranged for communication with other nodes of the communication network 100, such as other radio access network nodes, e.g. the second network node 150 of FIG. 2, or core network nodes, probably via wireline. The instructions executable by said processor 803 may be arranged as a computer program 805 stored e.g. in said memory 804. The processor 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above.

The computer program 805 may comprise computer readable code means, which when run in the network node 110 causes the network node to perform the steps described in any of the described embodiments of the network node. The computer program 805 may be carried by a computer program product connectable to the processor 803. The computer program product may be the memory 804. The memory 804 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 804. Alternatively, the computer program may be stored on a server or any other entity connected to the communication network to which the network node 110 has access via the communication unit 802. The computer program may then be downloaded from the server into the memory 804.

Figure 12:
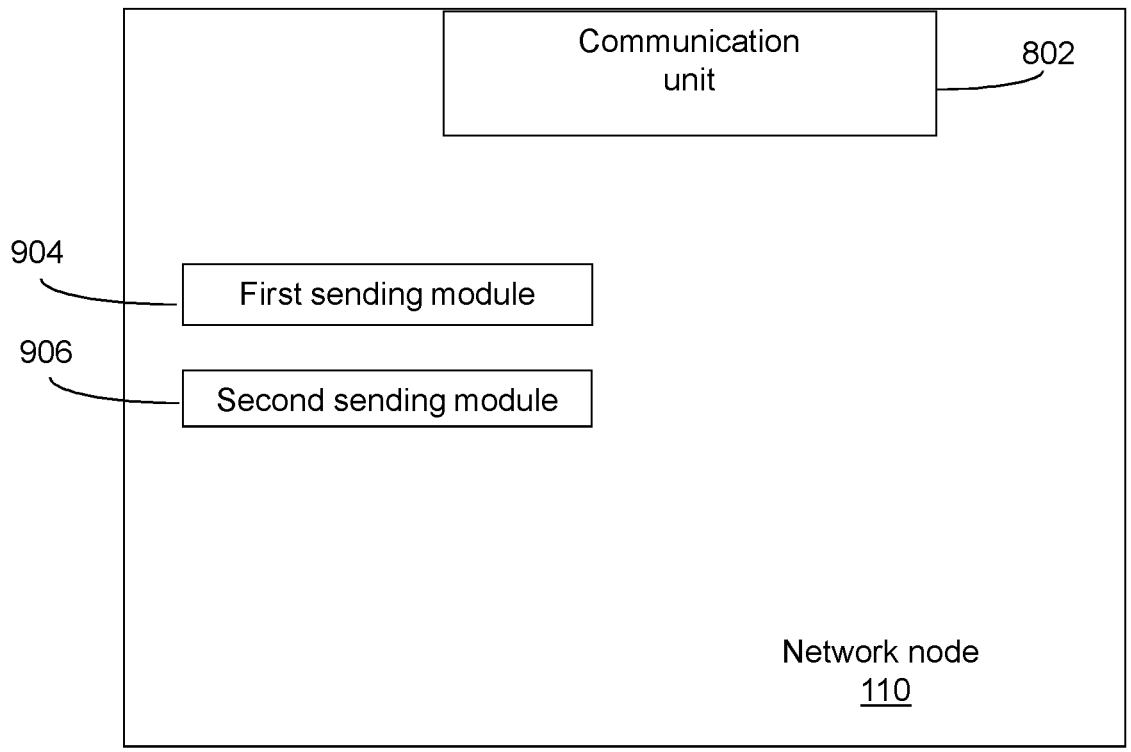

FIG. 12, in conjunction with FIG. 2, shows another embodiment of a network node 110 operable in a wireless communication system 100 configured for enhancing wireless communication with a communication device 120. The network node 110 comprises a first sending module 904 for sending, to the communication device, a first TA value at a first time point when the communication device is in active state, and a second sending module 906 for sending, to the communication device, at a time point later than the first time point, an instruction to determine whether the first TA value is still valid, and to employ the first TA value for sending data to the network node in accordance with the determination.

According to an embodiment, the network node 110 further comprises a triggering module for triggering sending of the instruction to the communication device in response to an indication of a load of the communication network above a certain threshold.

One or more of the above described embodiments provide one or more of the following advantages:
Improved latency reduction for small data transfer. The delay due to RACH access is omitted. This gives a significant reduction of the latency compared to the RACH procedures used today;
The RACH control channel resources are saved with the proposed RACH less synchronization procedures. RACH channel is often identified as the main bottleneck for small data transfer. One example is the massive machine type communication, MTC, scenario. It is mainly due to that there is limited RACH preamble resource. With RACH less procedure, the RACH load of the system is reduced;
The system capacity is also benefited due to the reduced RACH congestion;
Reduced intra cell interference due to UL timing misalignment.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a communication device for enhancing wireless communication with a network node of a wireless communication network, the method comprising:
  receiving, from the network node, a first timing advance (TA) value at a first time point when in the communication devices is in an active state, prior to switching to an inactive state;

subsequently switching from the inactive state to the active state, after obtaining an indication of data transfer;

determining, after switching to the active state, whether the first TA value is still valid;

employing the first TA value for sending data to the network node based on determining the first TA value to be still valid; and employing an updated TA value for sending data to the network node based on determining that the first TA value not to be still valid, wherein determining whether the first TA value is still valid comprises:

determining a first difference between a propagation time for a downlink signal sent from the network node to the communication device at the first time point and a propagation time for a downlink signal sent from a second network node to the communication device at the first time point;

determining a second difference between a propagation time for a downlink signal sent from the network node to the communication device at a second time point after the obtaining of the indication of data transfer and a propagation time for a downlink signal sent from the second network node to the communication device at the second time point, determining a third difference between the first difference and the second difference, determining the first TA value to be still valid when the third difference is below a third threshold, and determining the first TA value not to be still valid when the third difference is above the third threshold.

2. The method of claim 1, wherein the method further comprises, based on determining the first TA value not to be still valid, initiating a RACH procedure or other uplink signal transmission procedure with the network node, and receiving the updated TA value from the network node in response to the initiated procedure.

3. The method of claim 1, further comprising, based on determining the first TA value not to be still valid, determining the updated TA value based on the information related to propagation time at the first time point, the information related to propagation time at the second time point, and on the first TA value.

4. The method of claim 1, wherein the method further comprises, based on determining the first TA value not to be still valid, determining the updated TA value based on the following:

a measurement of reception time for a downlink synchronization signal sent from the network node at a second time point after the obtaining of the indication of data transfer;

a measurement of reception time for a downlink synchronization signal sent from the network node at the first time point;

a time interval between consecutively transmitted downlink synchronization signals; and a number of transmitted downlink synchronization signals between the first time point and the second time point.

5. A communication device operable for communication with a network node of a wireless communication network, the communication device comprising:

a processor; and a memory storing instructions executable by the processor, whereby the communication device is configured to:

receive, from the network node, a first timing advance (TA) value at a first time point when in the communication devices is in an active state, prior to switching to an inactive state;

subsequently switch from the inactive state to the active state, after obtaining an indication of data transfer;

determine, after switching to the active state, whether the first TA value is still valid;

employ the first TA value for sending data to the network node based on determining the first TA value to be still valid; and employ an updated TA value for sending data to the network node based on determining that the first TA value not to be still valid, wherein execution of the instructions configures the communication device to determine whether the first TA value is still valid based on:

determining a first difference between a propagation time for a downlink signal sent from the network node to the communication device at the first time point and a propagation time for a downlink signal sent from a second network node to the communication device at the first time point, determining a second difference between a propagation time for a downlink signal sent from the network node to the communication device at a second time point after the obtaining of the indication of data transfer and a propagation time for a downlink signal sent from the second network node to the communication device at the second time point, determining a third difference between the first difference and the second difference, determining the first TA value to be still valid when the third difference is below a third threshold, and determining the first TA value not to be still valid when the third difference is above the third threshold.

6. The communication device of claim 5, wherein:

execution of the instructions further configures the communication device to, based on determining the first TA value not to be still valid, initiate a RACH procedure or other uplink signal transmission procedure with the network node, and receive the updated TA value from the network node in response to the initiated procedure.

7. The communication device of claim 5, wherein execution of the instructions further configures the communication device to, based on determining the first TA value not to be still valid, determine the updated TA value based on the information related to propagation time at the first time point, the information related to propagation time at the second time point, and on the first TA value.

8. The communication device of claim 5, wherein execution of the instructions further configures the communication device to, based on determining the first TA value not to be still valid, determine the updated TA value based on the following:

a measurement of reception time for a downlink synchronization signal sent from the network node at a second time point after the obtaining of the indication of data transfer;

a measurement of reception time for a downlink synchronization signal sent from the network node at the first time point;

a time interval between consecutively transmitted downlink synchronization signals; and a number of transmitted downlink synchronization signals between the first time point and the second time point.

* * * * *